United States Patent
Edwards et al.

(10) Patent No.: US 7,593,975 B2
(45) Date of Patent: *Sep. 22, 2009

(54) FILE SYSTEM DEFRAGMENTATION TECHNIQUE TO REALLOCATE DATA BLOCKS IF SUCH REALLOCATION RESULTS IN IMPROVED LAYOUT

(75) Inventors: John K. Edwards, Sunnyvale, CA (US); Jeffrey Heller, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 11/109,886

(22) Filed: Apr. 20, 2005

(65) Prior Publication Data

US 2005/0187985 A1    Aug. 25, 2005

Related U.S. Application Data

(63) Continuation of application No. 10/027,634, filed on Dec. 21, 2001, now Pat. No. 6,978,283.

(51) Int. Cl.
*G06F 12/00* (2006.01)

(52) U.S. Cl. .................... 707/206; 707/205; 707/3; 711/170

(58) Field of Classification Search ................ 707/206, 707/205, 200, 3; 711/170
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |

(Continued)

OTHER PUBLICATIONS

Jake Necessary MCSE, Jan. 10, 2001, "Windows 2000 Disk Defragmenter is adequate for individual computers, but not for an entire network" pp. 1-5, http://articles.techrepublic.com.com/5100-1035_11-1041483.html.*

(Continued)

*Primary Examiner*—Hong Kim
(74) *Attorney, Agent, or Firm*—Cesari and McKenna, LLP

(57) ABSTRACT

A defragmentation technique determines the extent to which data blocks of a file are fragmented on disks of a computer and, in response, efficiently relocates those blocks if such relocation improves the on-disk layout of the file. Each indirect block of the file is examined and the current layout of the range of pointers referencing the data blocks is determined. In addition, the number of operations needed to retrieve those data blocks from disks is calculated. A potential new layout is then estimated based on an average fullness of the file system. If the potential new layout improves the fragmentation of the current layout, then the data blocks for that range are relocated, if there is sufficient free space on disk. Otherwise, the blocks are not relocated and the current on-disk layout of the file is maintained.

11 Claims, 6 Drawing Sheets

U.S. PATENT DOCUMENTS

| | | | |
|---|---|---|---|
| 4,899,342 | A | 2/1990 | Potter et al. |
| 4,989,206 | A | 1/1991 | Dunphy, Jr. et al. |
| 5,124,987 | A | 6/1992 | Milligan et al. |
| RE34,100 | E | 10/1992 | Hartness |
| 5,155,835 | A | 10/1992 | Belsan |
| 5,426,747 | A | 6/1995 | Weinreb et al. |
| 5,581,724 | A | 12/1996 | Belsan et al. |
| 5,778,392 | A * | 7/1998 | Stockman et al. ........... 707/205 |
| 5,819,292 | A | 10/1998 | Hitz et al. |
| 5,963,962 | A | 10/1999 | Hitz et al. |
| 6,397,311 | B1 | 5/2002 | Capps |
| 6,496,913 | B1 * | 12/2002 | Taugher et al. .............. 711/170 |
| 6,571,261 | B1 | 5/2003 | Wang-Knop et al. |
| 6,636,879 | B1 | 10/2003 | Doucette et al. |
| 6,735,678 | B2 * | 5/2004 | Noble et al. ................. 711/165 |
| 6,757,801 | B1 | 6/2004 | Best et al. |
| 6,763,428 | B1 * | 7/2004 | Cappon ...................... 711/112 |
| 6,895,418 | B1 * | 5/2005 | Crow et al. .................. 707/205 |
| 6,978,283 | B1 * | 12/2005 | Edwards et al. ............. 707/206 |
| 2001/0047451 | A1 * | 11/2001 | Noble et al. ................. 711/170 |
| 2002/0133683 | A1 * | 9/2002 | Jochemsen et al. .......... 711/170 |

OTHER PUBLICATIONS

Michael Kessler, Microsoft Corporation, "Maintaining Windows 2000 Peak Performance Through Defragmentation" pp. 1-8, http://www.microsoft.com/technet/prodtechnol/windows2000serv/maintain/optimize/w2kexec.mspx.*

Peter Norton, Peter Norton's Complete Guide to DOS 6.22, Sixth Edition, Sams Publishing, 1994, pp. 521-534.*

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing,* Proceedings of the 14$^{th}$ VLDB Conference, LA, CA (1988).

Blasgen, M.W. et al., *System R: An architectural Overview,* Reprinted from IBM Systems Journal vol. 20, No. 1, 1981© 1981, 1999.

Borenstein, Nathaniel S., *CMU's Andrew project a retrospective,* Communications of ACM, (39)12, Dec. 1996.

Brown, Mark R. et al., *The Alpine file system,* ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system,* In Proceedings of the USENIX Winter 1992.

Clark, B.E., et al., *Application System /400 Performance Characteristics,* IBM Systems Journal, 28(3): 407-423, 1989.

Data Sheet for the Check Point Software Technologies product FlIodGate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{article I have has no date or cite}.

Gait, Jason, *Phoenix: A Safe In-Memory File System.* Communications of the ACM, 33(1):81-86, Jan. 1990.

Hartman, John H. et al., *Performance Measurements of a Multiprocessor Sprite Kernel,* Proceedings of the USENIX Conference, 1990.

Hitz, Dave et al., *File System Design for an NFS File Server Appliance,* Technical Report 3002, Rev. C395, presented Jan. 19, 1994.

Howard, John H, et al. *Scale and Performance in a Distributed File System,* Carnegie Mellon University, CMU-ITC-87-068, Aug. 5, 1987.

Howard, John, H. et al., *Scale and performance in a distributed file system,* ACM Trans. Computer. System., 6(1), Feb. 1988 pp. 51-81.

Howard, John H., *An Overview of the Andrew File System,* Carnegie Mellon University, CMU-ITC-88-062.

*The IBM System/38*, Chapter 8, pp. 137-15.

Isomaki, Markus, *Differentiated Service for the Internet,* Department of Technical Physics and Mathematics, May 9, 1998.

Kazar, Michael L., et al., *Decorum File System Architectural Overview,* USENIX Summer Conference, Anaheim, California, 1990.

Lomet, David., et al., *The performance of a multiversion access method,* ACM SIGMOD International Conference on Management of Data, 19:353-363.

Lorie, Raymond, A, *Physical integrity in a large segmented database,* ACM Trans. Database Systems, (2)1: 91-104, Mar. 1977.

Lorie, RA, *Shadow Page Mechanism,* IBM Technical Disclosure Bulletin, Jun. 1986, pp. 340-342.

McKusick, Marshall Kirk, et al., *A Fast File System for UNIX,* Computer Science Division, Department of Electrical Engineering and Computer Sciences, Univ. of CA, Berkley, Feb. 18, 1994.

Miller, Ethan L., et al., *RAMA:A File System for Massively Parallel Computers,* 12$^{th}$ IEEE Symposium on Mass Storage Systems, Monterey CA, Apr. 1993, pp. 163-168.

Moons, Herman et al., *Location-Independent Object Invocation in Open Distributed Systems,* Autumn 1991 EurOpen Technical Conference and Exhibition, pp. 287-300 (Sep. 16-20, 1991).

Morris, James H., Et Al, *Andrew: A Distributed Personal Computing Environment,* Comm. of the ACM, vol. 29, Mar. 1986, pp. 184-201.

Mullender, Sape J., et al., *A distributed file service based on optimistic concurrency control,* ACM Symposium on Operating System Principles (Oras Island, Washington). Published as Operating Systems Review, 19(5):51-62, Dec. 1985.

Muller, Keith, et al., *A High Performance Multi-Structured File System Design,* In Proceedings of the 13th ACM Symposium on Operating Systems Principles, Oct. 1991, pp. 56-67.

Moons, Herman et al., *Location-Independent Object Invocation in Open Distributed Systems,* Autumn 1991 EurOpen Technical Conference and Exhibition, pp. 287-300 (Sep. 16-20, 1991).

Morris, James H., Et Al, *Andrew: A Distributed Personal Computing Environment,* Comm. of the ACM, vol. 29, Mar. 1986, pp. 184-201.

Mullender, Sape J., et al., *A distributed file service based on optimistic concurrency control,* ACM Symposium on Operating Principles (Orcas Island, Washington). Published as Operating Systems Review, 19(5):51-62, Dec. 1985.

Muller, Keith, et al., *A High Performance Multi-Structured File System Design,* In Proceedings of the 13th ACM Symposium on Operating Systems Principles, Oct. 1991, pp. 56-67.

Ousterhout, John K. et al., *The Sprite Network Operating System,* Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems,* Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?,* Digital WRL Technical Note TN-11, Oct. 1989.

Ousterhout, John, *A Brief Retrospective On The Sprite Network Operating System,* found at http://www.cs.berkeley.edu/projects/sprite/retrospective.html.visited on Mar. 11, 2005.

Patterson, D., et al., *A Case for Redundant Arrays of Inexpensive Disks (RAID),* Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID),* SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity,* University of CA, Santa Cruz, Master of Science in Computer Science Thesis, Sep. 2002.

Quinlan, Sean, *A Cached WORM File System,* Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory,* In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System,*, In Proceedings of ACM Transactions on Computer Systems, (10)1:26-52, Feb. 1992.

Sandberg, Russel et al., *Design and Implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite file System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *Laddis: The next generation in NSF file server benchmarking*, USENIX Association Conference Proceedings, Apr. 1993.

Microsoft Windows 95 Resource Kit, Microsoft Press, 1995, pp. 656-658.

\* cited by examiner

FILE SYSTEM DEFRAGMENTATION TECHNIQUE TO REALLOCATE DATA BLOCKS IF SUCH REALLOCATION RESULTS IN IMPROVED LAYOUT

CROSS-REFERENCE TO RELATED APPLICATION

The present application is a continuation of commonly assigned U.S. patent application Ser. No. 10/027,634, which was filed on Dec. 21, 2001 now U.S. Pat. No. 6,978,283, by John K. Edwards, et al, for a FILE SYSTEM DEFRAGMENTATION TECHNIQUE VIA WRITE ALLOCATION and is hereby incorporated by reference.

FIELD OF THE INVENTION

The present invention relates to file systems and, more specifically, to a technique for efficiently defragmenting a file of a file system.

BACKGROUND OF THE INVENTION

A file server is a computer that provides file service relating to the organization of information on writeable persistent storage devices, such memories, tapes or disks. The file server or filer may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network, wide area network or virtual private network implemented over a public network, such as the Internet. Each client may request the services of the file system on the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. However, because of the nature of a write-anywhere file system (i.e., data is not overwritten on disk), changes to the data may result in random, relocation of the blocks on disks. That is, over time and after many updates to the data, the blocks of a file may become randomly scattered over the disks such that the file can become fragmented. This, in turn, causes sequential access operations, such as sequential read operations, of the file to randomly access the disks. Random access operations to a fragmented file are generally much slower than sequential access operations, thereby adversely impacting the overall performance of those operations. The present invention is directed, in part, to solving this problem.

Defragmentation of a file has been accomplished using variations of a copy operation directed to relocating the inodes and blocks of the file on disks. An example of a conventional defragmentation process involves a client request to copy its database application files stored on disks of a server. In response to the copy request, the server file system loads the database files from the disks into memory, dirties them and rewrites them to the disks. A problem with this "copy" approach is that the conventional defragmentation process is not fully integrated with the file system and substantial care must be taken to avoid corrupting or losing client data during the process. That is, if blocks of a database file are moved while those blocks are being updated, the updated (written) data may be lost. As a result, the conventional copy approach to defragmentation requires "taking down" the client database to preserve consistency. This approach is inefficient and the present invention is directed to improving the efficiency of the defragmentation process.

SUMMARY OF THE INVENTION

The present invention comprises a defragmentation technique for determining the extent to which data blocks of a file are fragmented on disks of a computer and, in response, efficiently relocating those blocks if such relocation improves the on-disk layout of the file. According to the technique, each indirect block of the file is examined and the current layout of the range of pointers referencing the data blocks is determined. In addition, the number of operations needed to retrieve those data blocks from disks is calculated. A potential new layout for the range of pointers is then estimated based on an average fullness of a file system of the computer. If the potential new layout improves the fragmentation of the current layout, then the data blocks for that range are relocated, if there is sufficient free space on disk. Otherwise, the blocks are not relocated and the current on-disk layout of the file is maintained.

In the illustrative embodiment, the defragmentation technique described herein is embodied within an enhanced scanner of a write anywhere file system executing on a computer. Relocating the data blocks of the file is accomplished by loading the blocks into a memory of the computer and "dirtying" those blocks. The scanner invokes a write allocator of the file system to write those blocks to the new locations on the disks. Specifically, the write allocator "sweeps" a first disk for a predetermined distance searching for free blocks and then "fills" (writes to) those blocks with the dirtied data. The allocator then "jumps" (moves) to a second disk and repeats that sequence until all data blocks of the file have been relocated. The defragmentation technique may alternately be applied on a volume basis that essentially starts with a first range of blocks in a first file, proceeds to a last range of blocks within that file and then moves to a first range of blocks within a next file. This sequence continues for all files of the volume.

Advantageously, the novel defragmentation technique reallocates (rewrites) data blocks to disks only if such reallocation results in an improved on-disk layout. This feature of the invention reduces unnecessary disk input/output operations. In addition, the enhanced scanner is fully integrated with the memory (i.e., a buffer cache) of the file system to thereby enable safe operation on a file while a client application accesses and modifies the file. Therefore, the client application does not have to be taken down (as in the prior art) during defragmentation. Moreover, the enhanced scanner process "paces" the defragmentation workload such that it does not overload the file system, which could easily be overloaded with substantial write allocation requests.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN
ILLUSTRATIVE EMBODIMENT

Figure 1:
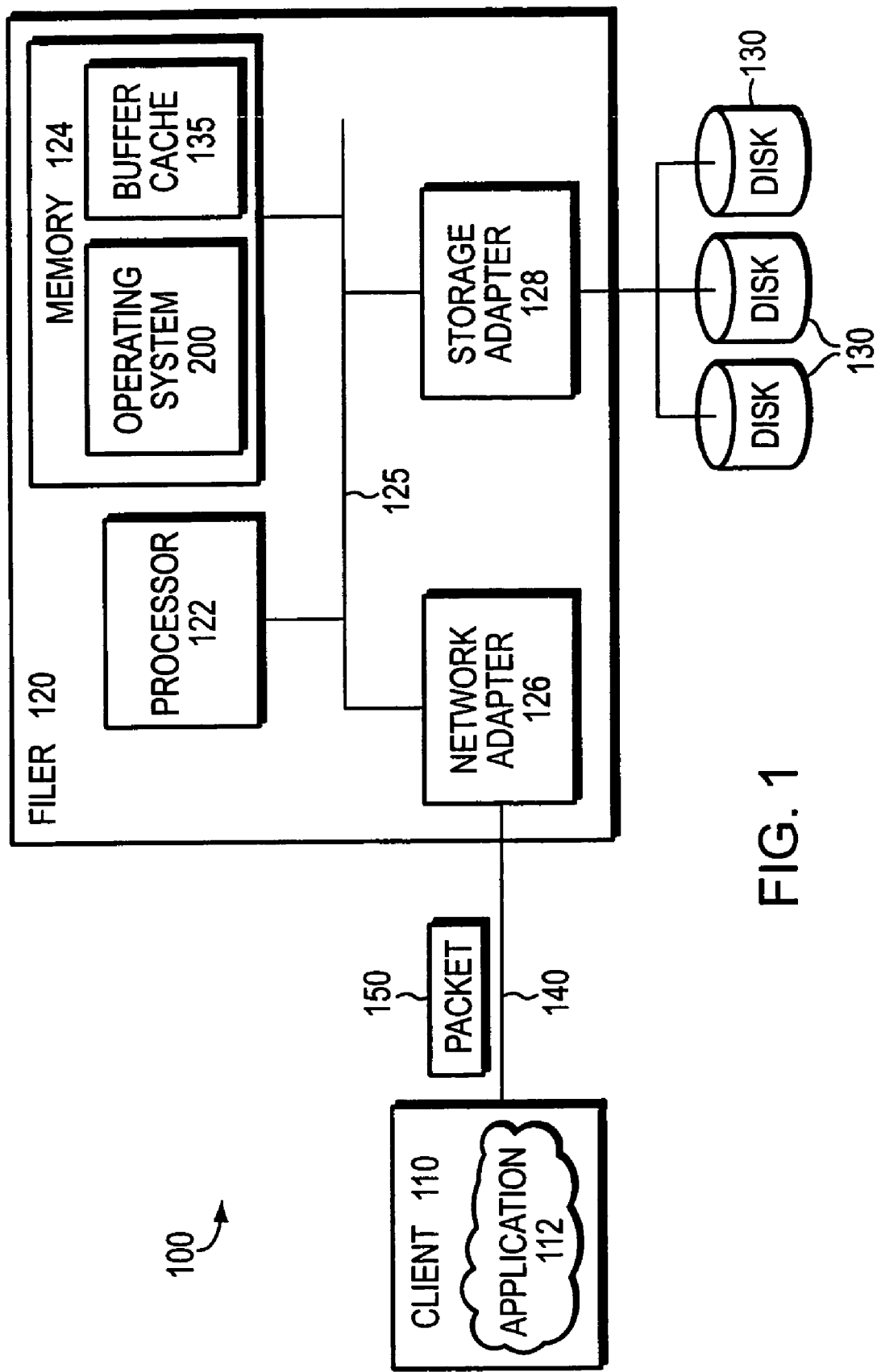
FIG. 1 is a schematic block diagram of a network environment including a file server that may be advantageously used with the present invention.

FIG. 1 is a schematic block diagram of a network environment 100 including a file server, such as a network storage appliance, that may be advantageously used with the present invention. The file server or filer 120 is a computer that provides file service relating to the organization of information on storage devices, such as disks 130. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks.

In the illustrative embodiment, the memory 124 comprises storage locations that are addressable by the processor and adapters for storing software program code. A portion of the memory may be further organized as a "buffer cache 135" for storing data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the Common Internet File System (CIFS) protocol or Network File System (NFS) protocol format over the network 140.

The storage adapter 128 cooperates with the storage operating system 200 executing on the filer to access information requested by the client. The information may be stored on the disks 130 or other similar media adapted to store information. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

To facilitate access to the disks 130, the storage operating system 200 implements a write-anywhere file system that logically organizes the information as a hierarchical structure of directories and files on the disks. Each "on-disk" file may be implemented as set of disk blocks configured to store information, such as data, whereas the directory may be implemented as a specially formatted file in which names and links to other files and directories are stored. In the illustrative embodiment described herein, the operating system is preferably the NetApp® Data ONTAP™ operating system available from Network Appliance, Inc., Sunnyvale, Calif. that implements a Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Figure 2:
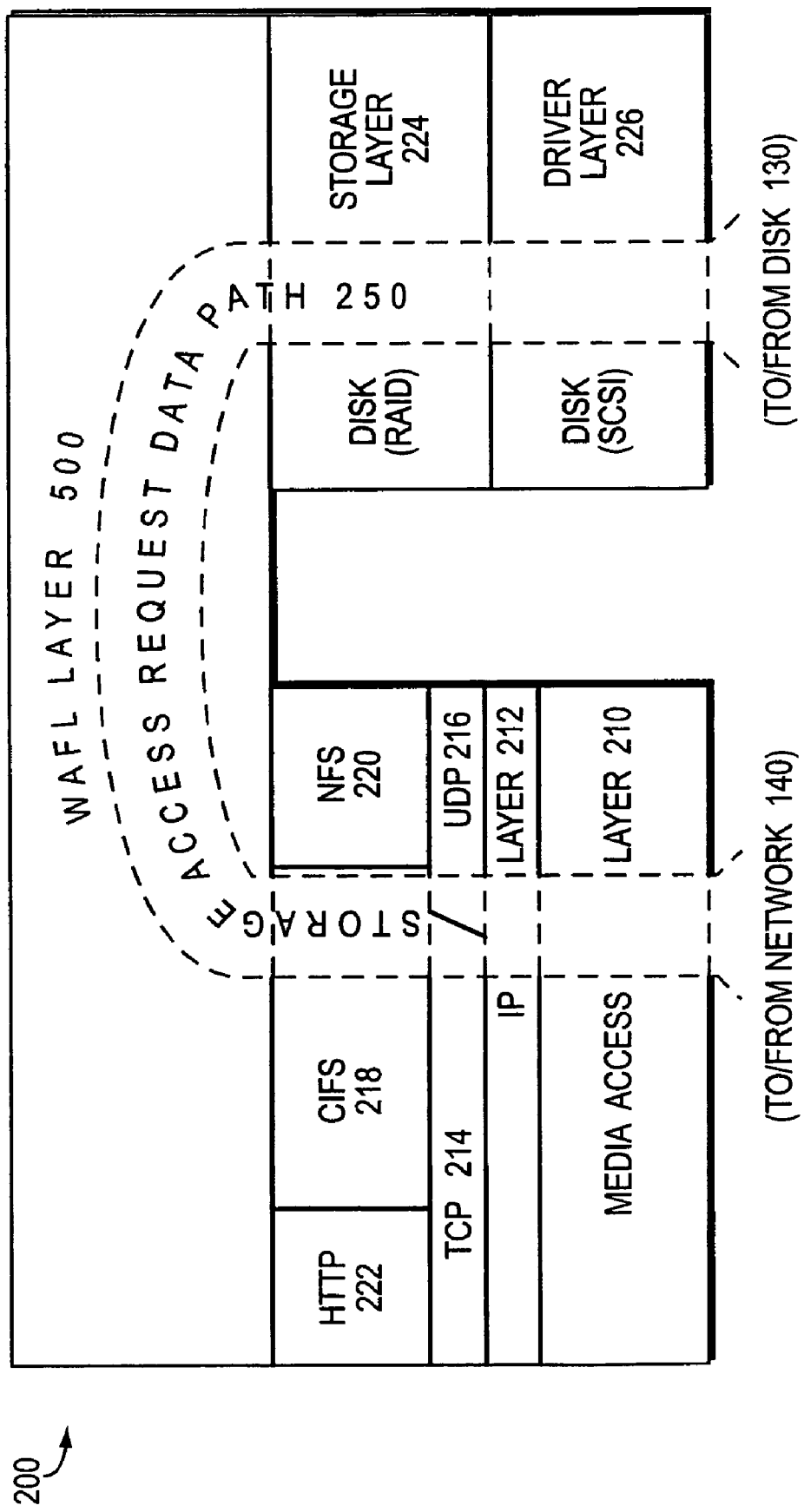
FIG. 2 is a schematic block diagram of a storage operating system including a write anywhere file layout (WAFL) file system layer that may be advantageously used with the present invention.

FIG. 2 is a schematic block diagram of the Data ONTAP operating system 200 that may be advantageously used with the present invention. The storage operating system comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a Redundant Array of Independent Disks (RAID) protocol, and a disk driver layer 226 that implements a disk access protocol such as, e.g., a Small Computer Systems Interface (SCSI) protocol.

Bridging the disk software layers with the network and file system protocol layers is a WAFL layer 500 that preferably implements the WAFL file system. The on-disk format representation of the WAFL file system is block-based using, e.g., 4 kilobyte (KB) blocks and using inodes to describe the files. The WAFL file system uses files to store meta-data describing the layout of its file system; these meta-data files include, among others, an inode file. A file handle, i.e., an identifier that includes an inode number, is used to retrieve an inode from disk.

Broadly stated, all inodes of the WAFL file system are organized into the inode file. A file system (FS) info block specifies the layout of information in the file system and includes an inode of a file that includes all other inodes of the file system. Each volume (file system) has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as, e.g., a conventional CIFS or NFS protocol packet 150 over the computer network 140 and onto the filer 120 where it is received at the network adapter 126. A network driver of the media access layer 210 processes the packet, passes it onto the network protocol layers 212-216 and CIFS or NFS layer 218, 220 for additional processing prior to forwarding to the WAFL layer 500. Here, the WAFL file system generates operations to load (retrieve) the requested data from disk 130 if it is not resident "in core", i.e., in the buffer cache 135. If the information is not in the cache, the WAFL layer 500 indexes into the inode file using the inode number to access an appropriate entry and retrieve a logical volume block number (VBN). The WAFL layer then passes the logical VBN to the disk storage (RAID) layer 224, which maps that logical number to a disk block number and sends the latter to an appropriate driver (e.g., SCSI) of the disk driver layer 226. The disk driver accesses the disk block number from disk 130 and loads the requested data block(s) in buffer cache 135 for processing by the filer. Upon completion of the request, the filer (and operating system) returns a reply to the client 110 over the network 140.

It should be noted that the software "path" through the storage operating system layers described above needed to perform data storage access for the client request received at the filer may alternatively be implemented in hardware. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110. Moreover, in another alternate embodiment of the invention, the processing elements of network and storage adapters 126, 128 may be configured to offload some or all of the packet processing and storage access operations, respectively, from processor 122 to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with storage applications described herein or with configurable functionality, which is configured for storage applications as described herein.

In addition, it will be understood to those skilled in the art that the inventive technique described herein may apply to any type of special-purpose (e.g., server) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
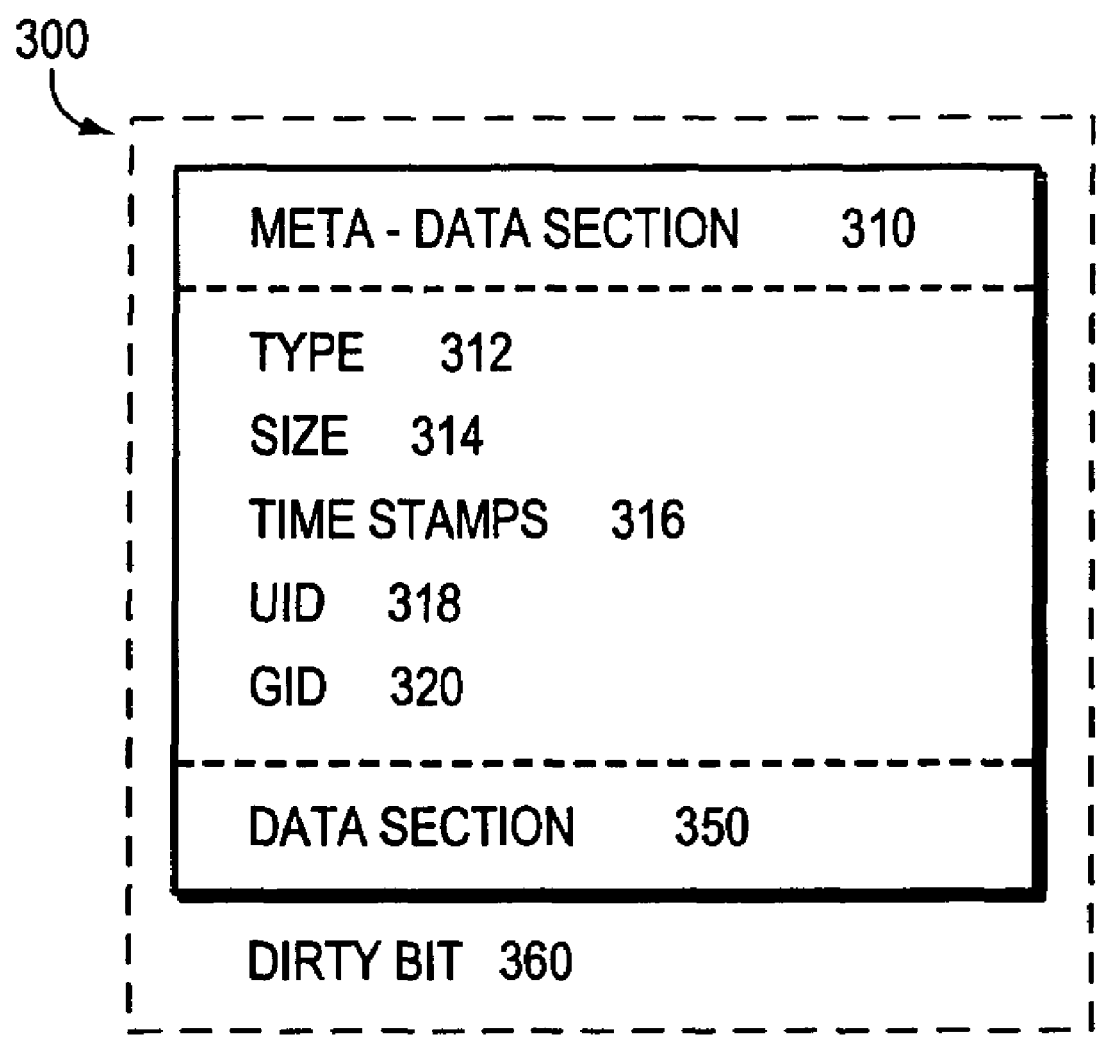
FIG. 3 is a schematic block diagram illustrating an inode data structure that may be advantageously used with the present invention.

In the illustrative embodiment, a file is represented in the WAFL file system as an inode data structure adapted for storage on the disks 130. FIG. 3 is a schematic block diagram illustrating an inode 300, which preferably includes a meta-data section 310 and a data section 350. The information stored in the meta-data section 310 of each inode 300 describes the file and, as such, includes the type (e.g., regular or directory) 312 of file, the size 314 of the file, time stamps (e.g., access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains meta-data controlled by the file system, whereas the data section of a regular inode contains user-defined data. In this latter case, the data section 350 includes a representation of the data associated with the file.

Specifically, the data section 350 of a regular on-disk inode may include user data or pointers, the latter referencing 4 KB data blocks on disk used to store the user data. Each pointer is preferably a logical VBN to thereby facilitate efficiency among the file system and the disk storage (RAID) layer 224 when accessing the data on disks. Given the restricted size (e.g., 128 bytes) of the inode, user data having a size that is less than or equal to 64 bytes is represented, in its entirety, within the data section of that inode. However, if the user data is greater than 64 bytes but less than or equal to 64 KB, then the data section of the inode (e.g., a first level inode) comprises up to 16 pointers, each of which references a 4 KB block of data on the disk. Moreover, if the size of the data is greater than 64 KB but less than or equal to 64 megabytes (MB), then each pointer in the data section 350 of the inode (e.g., a second level inode) references an indirect block (e.g., a first level block) that contains 1024 pointers, each of which references a 4 KB data block on disk. For user data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 KB data block on disk. Each data block is loaded from disk 130 into the buffer cache 135 in order to access the data.

Figure 4:
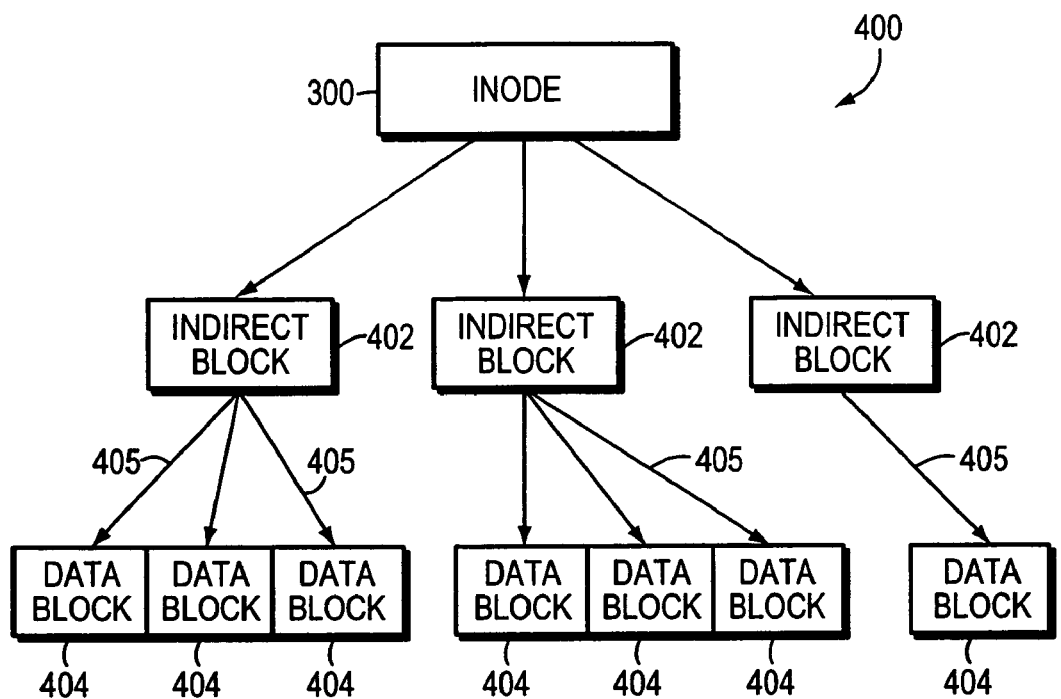
FIG. 4 is a schematic block diagram illustrating an organization of blocks in the WAFL file system.

FIG. 4 is a schematic block diagram illustrating an organization 400 of blocks in the WAFL file system. An inode 300, such as an embedded inode, references indirect blocks 402. As noted, these indirect blocks contain pointers 405 that reference data blocks 404 used to store the actual data of a file. That is, the data of a file are contained in data blocks and the locations of these blocks are stored in the indirect blocks of the file. Each indirect block 402 may contain pointers to as many as 1024 data blocks. According to the "write anywhere" nature of the WAFL file system, these blocks may be located anywhere on the disks 130 of the file system. Therefore, retrieval of the 1024 blocks referenced by an indirect block 402 may require seeking to anywhere from 1024 different regions on the disk to one region on the disk.

When an on-disk inode (or block) is loaded from disk 130 into buffer cache 135, its corresponding in core structure embeds the on-disk structure. For example, the dotted line surrounding the inode 300 (FIG. 3) indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL file system, including the inodes and inode file, are disclosed and described in U.S. Pat. No. 5,819,292 titled Method for Maintaining Consistent States of a File System and for Creating User-Accessible Read-Only Copies of a File System by David Hitz et al., issued on Oct. 6, 1998, which patent is hereby incorporated by reference as though fully set forth herein.

Figure 5:
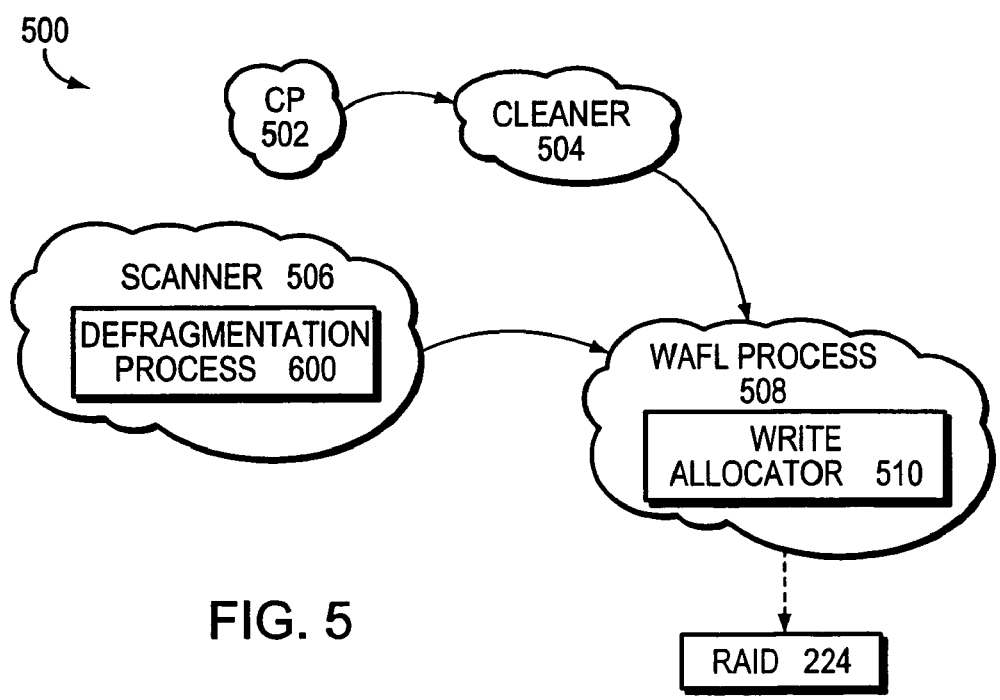
FIG. 5 is a schematic block diagram illustrating the various processes within the WAFL layer.

Various processes within the WAFL layer cooperate to service a client request "in core" and thereafter "dirty" the appropriate inodes and blocks prior to storing (writing) them to disks. FIG. 5 is a schematic block diagram illustrating the various processes within the WAFL layer 500 of the storage operating system 200. These processes include a consistency point (CP) process 502, a cleaner process 504, a scanner process 506 and a WAFL process 508. In general, the WAFL process 508 performs all the work in the WAFL layer, e.g., loading blocks into the buffer cache 135, setting dirty bits of the blocks, and acquiring blocks for "cleaning". The WAFL process 508 is preferably implemented as two processes, WAFL_LoPri and WAFL_HiPri, only one of which can run at a time and which are interchangeable except for the priority level at which they run. The scanner, CP and cleaner processes are essentially administrative processes that manage the work performed by the WAFL process. To that end, the administrative processes send messages to the WAFL process 508, instructing that process to execute particular functions with particular data supplied by the administrative processes. The WAFL process then processes/manipulates the data structures in the buffer cache and sends messages to the RAID layer 224 for purposes of loading/storing data on disks.

For example, the CP process 502 manages write allocation operations of the file system, whereas the cleaner process 504 manages "cleaning" of the buffer cache 135. These processes cooperate to provide dirtied blocks from the cache 135 to a write allocator 510 of the WAFL process. The write allocator 510 interacts with the RAID layer to obtain information about the layout of the disks. In addition, the write allocator interacts with other processes of the WAFL layer 500, including the scanner 506, to obtain information relating to the optimal order of which data for files should be written to the disks. The write allocator 510 then writes the data to disk, one file at a time, in accordance with a write allocation algorithm. To invoke write allocation, the cleaner process 504 sends a message to the WAFL process 508 requesting a write allocation function for a particular structure (e.g., inode).

It should be noted that all write operations in the file system are performed to "free space" blocks on disks. A free space block represents an available location (e.g., data block 404) on disk that is not currently used to store valid information. When storing a file to disk, the write allocator 510 of the WAFL layer 500 writes into these free blocks at a write allocation point. The write allocator generally writes only a certain number of blocks to a given disk prior to moving to a next disk, so as to spread the data across multiple disks. Notably, the write allocator 510 writes the file data in generally the same area of the disk during a CP operation.

The present invention comprises a defragmentation technique for determining the extent to which data blocks of a file are fragmented on disks of a computer and, in response, efficiently relocating those blocks on the disks if such relocation improves the on-disk layout of the file. Defragmentation in the WAFL file system pertains only to the active files, each of which may comprise indirect blocks that point to data blocks of the file. Inactive files, such as snapshot files, are not affected by the defragmentation process so as to avoid errors or problems that may arise when moving (relocating) the snapshot files. As used herein, a "snapshot" represents a consistent copy of the file system at a particular point in time, e.g., at a consistency point transition. Rather than discarding the old copy of the file system at the consistency point, the WAFL file system saves it as a snapshot. Thus, snapshots enable the filer to save copies of its file system state at various times.

The novel defragmentation technique may be advantageously implemented in the WAFL file system because of the write anywhere nature of the file system (as opposed to the write in-place nature of conventional file systems). As described herein, defragmentation in the WAFL file system generally comprises reading an entire indirect block's worth of data (e.g., 1024 data blocks) from disk into the buffer cache 135 and then dirtying those data blocks. At the next consistency point, these dirtied data blocks are stored as contiguously as possible on the disks. The data blocks retrieved from disk are generally not processed (updated); they may be merely marked "dirty" using the dirty bit 360 of the in core data structure to invoke the CP process 502.

According to the invention, the scanner 506 is enhanced to include the novel defragmentation process 600 described herein. The enhanced scanner 506 is invoked in response to, e.g., a command line interface (CLI) command from a user, a predetermined volume operation or a client request (e.g., a CIFS RPC), to defragment a particular file. Upon invocation, the scanner examines the range of pointers 405 referencing the data blocks 404 and determines whether it can organize those data blocks in a more optimal layout on the disks. Specifically, the scanner 506 sorts the pointers 405 of each indirect block 402 and performs an approximation of the number of seek operations needed to retrieve those data blocks from disks. To that end, the scanner considers a predetermined distance (the "write_alloc_chunk") used by the write allocator 510 when sweeping each disk during a write allocation process. In the illustrative embodiment, the write_alloc_chunk preferably comprises 32 data blocks, such that 32 write_alloc_chunks represent an optimal (one extreme case) layout on those disks. In contrast, 1024 write_alloc_chunks represent a suboptimal (another extreme case) layout of the disks. The scanner thus determines the number of write_alloc_chunks needed to cover the 1024 data blocks referenced by an indirect block.

In accordance with the invention, a threshold value is set between the two extreme cases, depending upon the "fullness" of the file system. The fullness of the file system is necessary because it denotes the best layout that can be expected if all of the data blocks referenced by the indirect block are marked dirty. If the file system is generally empty, defragmentation may result in a better layout of the disk, whereas if the file system is essentially full, defragmentation may not result in a better layout. In other words, if write allocation of the dirty-marked blocks results in fewer write_alloc_chunk "regions" on the disk, thereby requiring fewer seek operations to retrieve the data in those regions, the novel defragmentation process 600 is invoked for that indirect block's worth of data blocks. Otherwise, the defragmentation process is not invoked.

If the process 600 is invoked, the scanner sends a message to the WAFL process 508, instructing that process to load the inode 300 of the file, including each indirect block 402 of the file, into the buffer cache 135. The range of blocks processed by the WAFL process as a result of a function request sent by the scanner is preferably 1024 blocks (i.e., an indirect block's worth of data blocks). Thus, the scanner further instructs the WAFL process to load an indirect block's worth of data blocks into the buffer cache, if they are not already loaded. The scanner then requests the WAFL process to assert the dirty bit in each of those loaded data blocks, if that bit is not already asserted. The scanner thus instructs the WAFL process 508 to "walk" the pointers 405 of each indirect block 402 of a file, load the data blocks 404 referenced by those pointers into the buffer cache 135 and mark those loaded data blocks "dirty".

Thereafter, the CP process 502 "wakes up" and sends a message to the cleaner process 504 to acquire those dirty blocks. The CP process transitions from an "inactive" state to an active state in response to, e.g., a timer condition or a saturation of memory condition. In response to the CP process message, the cleaner 504 sends a message to the WAFL process 508 to obtain the dirtied structures from the buffer cache for purposes of write allocation. The write allocator 510 then "picks up" these dirtied blocks (that are ordered per file) and write allocates (stores) them substantially contiguously on disks.

By gathering many dirtied service requests prior to writing to disk, the WAFL file system is able to amortize some of the higher-level indirect block updates for, e.g., a plurality of inodes that are contiguous. The contiguous inode changes require updates to the same inode file block and the same inode file indirect block. All changes/updates to the inodes/blocks are made in core, including changes to the in core copy of the inode file. After write allocating (storing on disk) all regular files and directories, the inode file and its inode file blocks are write allocated to disk. Note that these write allocation operations are batched into large groups (batches) that are then sent to the write allocator of the file system. It should be also noted that the write allocation process of the WAFL file system always attempts to write dirtied data to generally the same area on disk.

If a request is received at the filer that is directed to updating the data blocks of this region of the file, those blocks are updated even if the dirty bits are asserted; if those bits are not already asserted, then the WAFL process will assert them. On the other hand, if the client application 112 had previously requested the data blocks and dirtied them, the write allocator 510 need only write allocate those blocks to disk. This latter sequence is made possible because the enhanced scanner is fully integrated with the buffer cache and thus ensures safe operation on a file while the client application accesses and modifies the file data.

Figure 6:
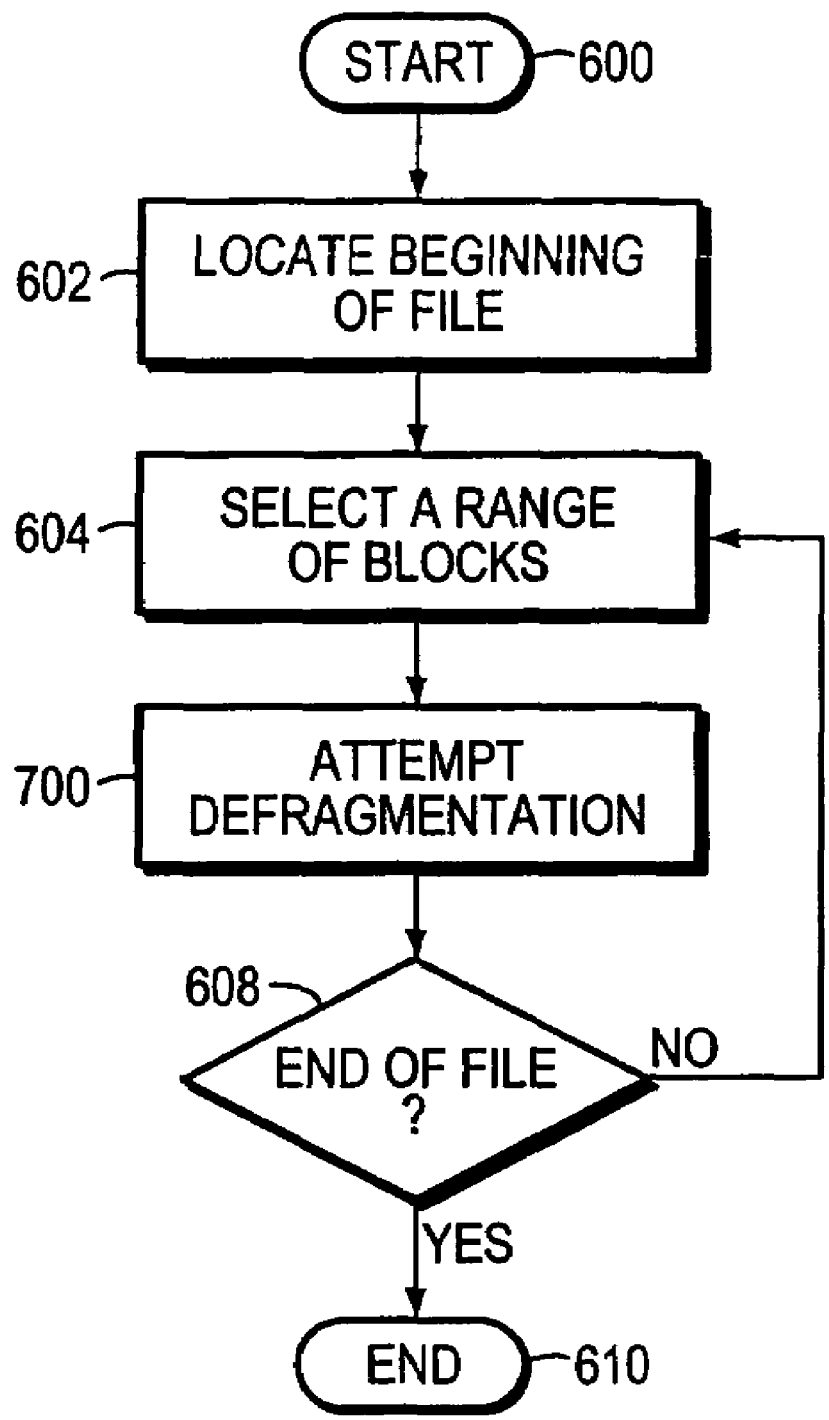
FIG. 6 is a flowchart illustrating the sequence of steps involved with defragmentation of a file in accordance with the present invention.

FIG. 6 is a flowchart illustrating the sequence of steps involved with defragmentation of a file. The process begins at Step 600 and proceeds to Step 602 where the beginning of a file is located. At Step 604, a range of data blocks is selected and, in Step 700, defragmentation of the range of data blocks is attempted. In the illustrative embodiment, the range of data blocks is 1024 (or fewer) blocks referenced by a single indirect block. After attempting to defragment a given range of blocks, a determination is made in Step 608 as to whether the end of the file is reached. If so, the sequence ends in Step 610. Otherwise, the sequence returns to Step 604 where defragmentation of another selected range of data blocks is attempted. This return sequence repeats until defragmentation of all ranges of data blocks within the file has been attempted.

Figure 7:
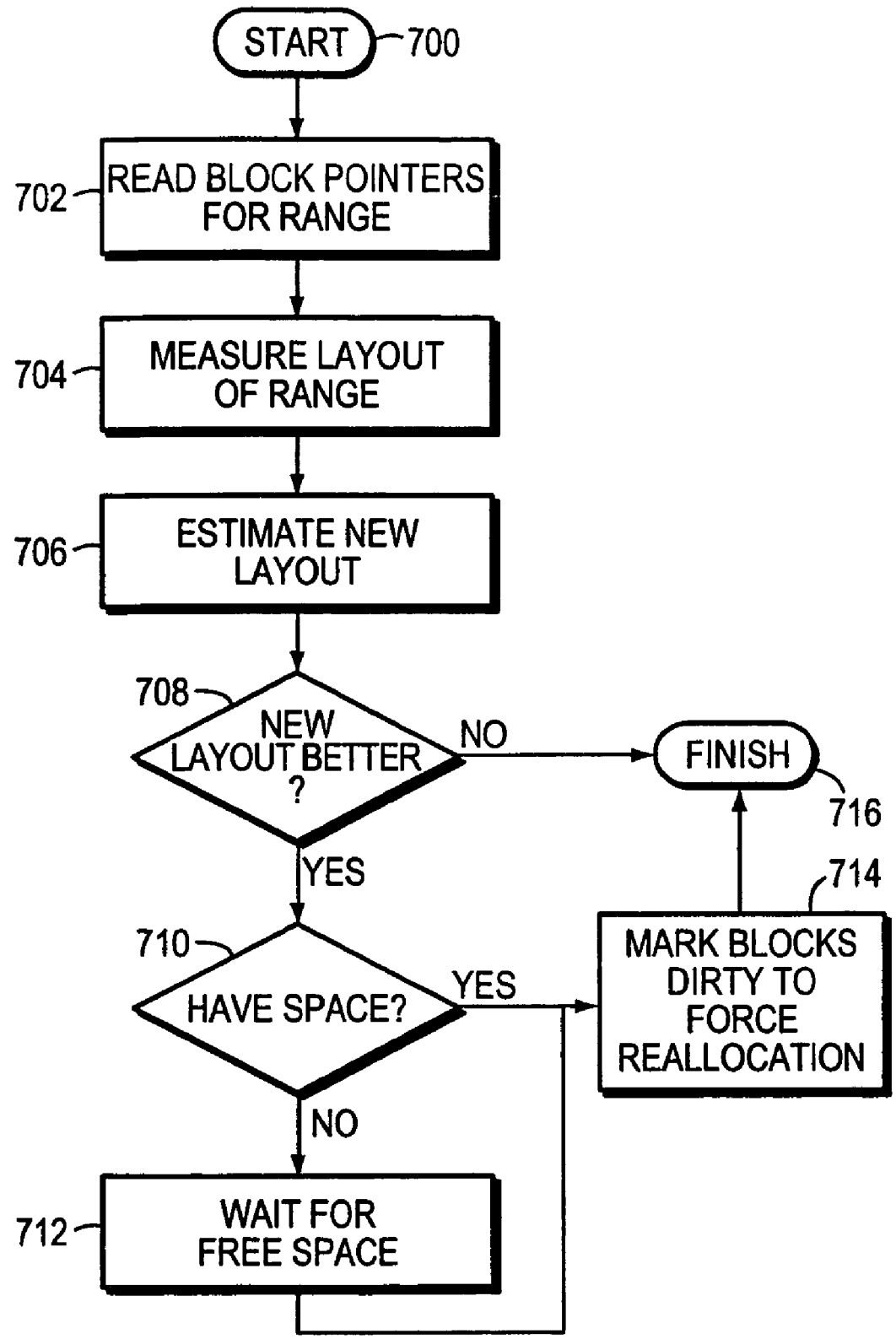
FIG. 7 is a flowchart illustrating the sequence of steps involved with an attempted defragmentation of a range of blocks in accordance with the present invention.

FIG. 7 is a flowchart illustrating the sequence of steps involved with the attempted defragmentation of a range of blocks. The sequence starts at Step 700 and proceeds to Step 702 where pointers for a range of blocks are read. As noted, the decision as to whether to reallocate a given range of blocks is determined by examining the layout of the range of blocks with an expected layout that would be provided by the write allocator. In Step 704, the existing layout is measured by calculating the number of write_alloc_chunk contiguous regions needed to cover the blocks in the range. This may be a number ranging from the number of blocks in the range (e.g., 1024) and the number of blocks in the range divided by the write_alloc_chunk (e.g., 1024 divided by a write_allocat_chunk). In Step 706, the potential new layout of the range of blocks is estimated using the average fullness of the file system or the average fullness of the write allocation range currently employed by the write allocator. Estimation of the average file system fullness allows determination of the number of write_alloc_chunk regions that will cover the blocks in the new layout if the defragmentation process reallocates them.

In Step 708, a determination is made as to whether the new layout is "better" than the existing layout by comparing the existing and estimated numbers of write_alloc_chunk extents. For example, assume the fullness of the file system is such that half of the disk space is available. For each write_alloc_chunk region comprising 32 blocks, it is expected that (on average) 16 blocks are available for writing by the WAFL system. To write the new 1024 blocks, 64 new allocation regions are needed (i.e., 1024 divided by 16). If the 1024 blocks are currently spread over, e.g., 70 write_alloc_chunk regions, then the defragmentation process will result in a better layout (i.e., 64 v. 70) and, therefore, the process will be invoked. In an alternate embodiment, another policy may be implemented whereby the improvement must be, e.g., 20% or greater before the defragmentation process is invoked.

If reallocating the blocks makes the situation worse (more regions to cover the blocks and thus more seek operations to read the data sequentially) then the defragmentation process is finished with that range (Step 716). If reallocating the blocks makes the fragmentation better, the sequence then proceeds to Step 710 where a determination is made as whether there is sufficient free space in the file system. This is necessary since, if the data is "snapshotted", writing a new copy of the data may result in a net increase of used disk space. If re-writing the data would result in using too much space, the sequence suspends until space is freed (Step 712). An alternative at this step is to abort the defragmentation process.

Once there is sufficient free space, the blocks to be defragmented are read into the buffer cache and dirtied (Step 714). At that point, the write allocation process re-writes them at new locations on disk. Once they are marked dirty, defragmentation of that block is completed at Step 716. Notably, defragmentation of an entire file system may be accomplished by defragmenting each file in turn. That is, the defragmentation technique described herein may be applied on a volume basis that essentially starts with a first range of blocks in a first file, proceeds to a last range of blocks within that file and then moves to a first range of blocks within a next file. This aspect of the present invention continues for all files of the volume.

It should be noted that the nature of the WAFL file system ensures data consistency during the defragmentation sequences described above. All client interactions are performed on a logical basis with knowledge of the locations of blocks on disks hidden from client processes. Thus, during these sequences, nothing has changed from the perspective of the users of the file system except performance and possibly consumed disk space. Since the clients never use physical block locations, it is impossible for the clients to use "stale" physical block locations at any point. Moreover, since the defragmentation process operates in conjunction with the buffer cache, any changes to a file by a client are visible to the novel process. That is, the defragmentation process is "aware" of changes made or that will be made based on the results of the novel process if those changes are made after the process executes.

In sum, the sequences illustrated by the flowcharts of FIGS. 6 and 7 are implemented as a function executed by the WAFL process 508 in response to a request message sent by the scanner 506. Execution of the function results in the retrieval of indirect blocks and examination of VBNs to determine the number of regions on disks that are consumed by the VBNs. In addition, the executed function results in a determination of the number of regions consumed if those VBNs were write allocated in accordance with the defragmentation process. If defragmentation results in a better layout, the blocks identified by the VBNs as marked dirty. The function then returns and a message is returned to the scanner. Thereafter, the scanner provides a second range of blocks for which the WAFL process executes its function. This sequence continues for the entire file. The message returned by the WAFL process to the scanner indicates whether or not defragmentation was performed for that particular range of blocks. The actual write allocation of the dirtied blocks is performed in accordance with the write allocation process involving the CP, cleaner and WAFL processes.

Advantageously, the novel defragmentation technique rewrites (reallocates) data blocks to the disks only if such reallocation would result in a better layout; otherwise, those data blocks are not reallocated (write allocated). This feature of the invention limits unnecessary disk I/O operations. In addition, a client application does not have to be "taken down" because of the integrated nature of the scanner and buffer cache. Moreover, the scanner process "paces" the defragmentation workload such that it does not overload the WAFL file system, which could easily be overloaded with substantial write allocation requests.

While there has been shown and described an illustrative embodiment for determining the extent to which data blocks of a file are fragmented on disks of a computer and, in response, efficiently relocating those blocks if such relocation improves the on-disk layout of the file, it is to be understood that various other adaptations and modifications may be made within the spirit and scope of the invention. For example, a space map could be used to determine whether defragmentation should be invoked for a certain range of blocks. Briefly, the space map indicates the available free space blocks within fixed sized regions of a contiguous array of disks. The granularity of the regions is preferably 1024 blocks. The write allocator may use the space map to construct ranges of stripes on the disk and determines the availability (e.g., percent of free blocks) per range of stripes. The write allocator then selects a region having the highest availability of free blocks at which it may write the dirtied blocks. Therefore, when the defragmentation process renders a decision to write allocate data blocks within a range of 1024 blocks, rather than using the free space in the file system as a reference, it can use the free space in the allocation range as specified by the space map. An example of a space map that may be advantageously used with the present invention is disclosed in U.S. Pat. No. 6,636,879 titled SPACE ALLOCATION IN A WRITE ANYWHERE FILE SYSTEM by Doucette et al., issued on Oct. 21, 2003, which is hereby incorporated by reference.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for defragmenting data blocks on storage devices of a computer configured to implement a file system that logically organizes the blocks as a file on the storage devices, comprising:

determining a current layout of selected data blocks on the storage devices;

determining a fragmentation of the current layout, the fragmentation calculated as an approximate number of operations necessary to retrieve the selected data blocks;

estimating a fragmentation of a potential new layout of the data blocks on the storage devices, wherein the potential new layout is estimated based on an average fullness of a file system of the computer to determine an estimate of write allocation chunk regions necessary for the potential new layout; and relocating the data blocks on the storage devices if the potential new layout has less fragmentation then the current layout, by relocating the data blocks if there is sufficient free space on the storage devices, loading the data blocks into the memory of the computer and dirtying the data blocks, searching a predetermined distance of a first storage device for free blocks, filling those free blocks with the dirtied data blocks jumping to a second storage device, searching the predetermined distance of the second storage device for additional free blocks, and filling those additional free blocks with the dirtied data blocks.

2. The method as set forth in claim 1, wherein the step of relocating further comprises repeating the steps of jumping, searching and filling until all data blocks of the file have been relocated.

3. The method as set forth in claim 1, wherein the predetermined distance is 32 data blocks.

4. The method as set forth in claim 1, further comprising:
referencing the selected data blocks on the storage devices by at least one indirect block having at least one pointer.

5. The method as set forth in claim 1, further comprising:
referencing the selected data blocks on the storage devices by an indirect block containing a plurality of pointers.

6. The method as set forth in claim 1, further comprising:
referencing the selected data blocks on the storage devices by a plurality of indirect blocks having a plurality of pointers.

7. A method, comprising:
determining a current layout of selected data blocks on one or more storage devices, the data blocks logically organized as a file on the storage devices;
determining a first approximate number of operations necessary to retrieve the selected data blocks;
estimating a second approximate number of operations necessary to retrieve the selected data blocks according to a potential new layout of the data blocks on the storage devices, wherein the potential new layout is estimated based on an average fullness of a file system of the computer to determine an estimate of write allocation chunk regions necessary for the potential new layout; and
relocating the data blocks on the storage devices to the new layout if the second approximate number of operations is less than the first approximate number, by
relocating the data blocks if there is sufficient free space on the storage devices,
loading the data blocks into a memory,
dirtying the data blocks,
searching a predetermined distance of a first storage device for free blocks,
filling those free blocks with the dirtied data blocks,
jumping to a second storage device,
searching the predetermined distance of the second storage device for additional free blocks, and
filling those additional free blocks with the dirtied data blocks.

8. The method of claim 7, wherein relocating further comprises: repeating the steps of jumping, searching and filling until all data blocks of the file have been relocated.

9. The method of claim 7, further comprising:
referencing the selected data blocks on the storage devices by at least one indirect block having at least one pointer.

10. The method of claim 7, further comprising:
referencing the selected data blocks on the storage devices by an indirect block containing a plurality of pointers.

11. The method of claim 7, further comprising:
referencing the selected data blocks on the storage devices by a plurality of indirect blocks having a plurality of pointers.

* * * * *